United States Patent [19]

Soni et al.

[11] 4,285,913

[45] Aug. 25, 1981

[54] PROCESS OF MAKING MANGANOUS SULPHATE SOLUTION WITH LOW LEVEL IMPURITY OF POTASSIUM FOR MANUFACTURE OF ELECTROLYTIC MANGANESE DIOXIDE

[75] Inventors: Vasantlal B. Soni, Bombay; Krishnasami Swaminathan, Calcutta, both of India

[73] Assignee: Union Carbide Corporation, New York, N.Y.

[21] Appl. No.: 143,632

[22] Filed: Apr. 25, 1980

[51] Int. Cl.³ ............................................... C01G 45/10
[52] U.S. Cl. ....................................... 423/50; 423/49; 423/544; 423/605
[58] Field of Search ....................... 423/50, 52, 544, 49

[56] References Cited

U.S. PATENT DOCUMENTS 3,227,520  1/1966  Samonides ............................. 423/52

FOREIGN PATENT DOCUMENTS 1300101  7/1969  Fed. Rep. of Germany ............. 423/52
756362   9/1956  United Kingdom ....................... 423/52
1092001  11/1967 United Kingdom ...................... 423/544
1405038  9/1975  United Kingdom ...................... 423/544
185863   12/1966 U.S.S.R. .................................... 423/52

*Primary Examiner*—Herbert T. Carter
*Attorney, Agent, or Firm*—Cornelius F. O'Brien

[57] ABSTRACT

Large proportion of available manganese ores contain high proportions of potassium. Electrolytic manganese dioxide (EMD) is manufactured from manganous sulphate obtained from naturally occuring manganese ores. Crystallographically EMD has to be essentially gamma phase and other phases, alpha and beta should be the bare minimum. High potassium content is, however, an obstruction in the way of getting gamma phase EMD. The present invention describes a method of making manganous sulphate solution with low level impurity of potassium from high potassium ores which comprises adding the reduced ore to spent electrolyte containing ferric ions and digesting same at pH 1–2 and temperature of 60°–90° C. for 1–4 hours, and thereafter again adding reduced ore to the digested product till pH is raised to 4–6.

6 Claims, No Drawings

PROCESS OF MAKING MANGANOUS SULPHATE SOLUTION WITH LOW LEVEL IMPURITY OF POTASSIUM FOR MANUFACTURE OF ELECTROLYTIC MANGANESE DIOXIDE

This invention relates to a process of making manganous sulphate solution with low level impurity of potassium for manufacture of Electrolytic Manganese Dioxide.

Electrolytic Manganese Dioxide (EMD) is synthetically manufactured with naturally occuring manganese ore as the starting material. The most important property of EMD is its crystallographic structure. It has to be essentially gamma phase and the other crystal phase like alpha and beta have to be kept bare minimum. Alpha phase $MnO_2$ is characterised by the presence of potassium in the crystal lattice and can be loosely described as $K\ Mn_8O_{16}$. Therefore, the potassium content of EMD should be as low as possible, preferably within 0.3%.

The main source of potassium in EMD is the starting natural ore. In India, the chief deposits of $MnO_2$ are of pyrolusite/cryptomelane type and cryptomelane contains potassium in varying concentrations. The pure pyrolusite ore contains little or negligible potassium. But most of the $MnO_2$ deposits in India, particularly in Central and Eastern India, are of cryptomelane type and potassium content is of the order of 1%. Some ore deposits contain potassium up to 2-3%.

Similar situation exists in many other countries.

If this ore is used as a raw material for manufacture of EMD using conventional process, the intermediate $MnSO_4$ solution will contain potassium impurity more than acceptable and will ultimately give EMD contaminated with unacceptably higher alpha phase $MnO_2$.

Hence there is a need to develop a method (which we have done and which forms the subject hereof) for the production of EMD using high potassium $MnO_2$ ores with the end product having essentially gamma phase (Potassium less than 0.3%). Since large proportion of available ores are of high potassium content, the method developed by us is of immense importance.

The object of this invention is to propose a process for minimising potassium impurity of $MnSO_4$ solution for use in EMD manufacture, such $MnSO_4$ being obtained from manganese ores having potassium content more than 0.8 percent.

The prior art on the use of high potassium ore reveals two methods:

(a) Aqueous leach process: In this process the ore is calcined with a reducing agent to MnO. The chemical bond between potassium and manganese dioxide in the crystal lattice of cryptomelane is thus broken and potassium is converted to soluble carbonate or inactive complex silicates. Such a calcine is leached with hot water to remove soluble potassium and separated and further dissolution of calcine so treated in acid yields an electrolyte solution sufficiently low in potassium to give gamma phase EMD.

(b) There is another method which uses powdered ferromanganese. Ferromanganese is added to the raw solution of MnO in $H_2SO_4$ or to spent electrolyte to produce a precipitate of ferric hydroxide at a pH of 6.0 to 6.5. Ferric hydroxide precipitate is claimed to occlude potassium and the filtered solution is said to contain low potassium.

The method proposed herein uses ferric iron compound to remove potassium impurity from $MnSO_4$ solution during its preparation. It basically consists of digestion of partly neutralised solution of $MnSO_4$ (spent electrolyte liquor of EMD cells) with soluble ferric ions at pH between 1-2 but preferably at $1.6\pm0.1$ at temperature of 60°-90° C.—higher temperature being more effective—for a period between 1-4 hours. At the end of this period further neutralisation of free acid can be done using MnO, CaO or like base as required to completely precipitate iron. Reduced manganese ore (MnO) may be used advantageously.

This method differs from the first method (method "a" referred to above) in which intermediate stage digestion of partly neutralised $MnSO_4$ solution as mentioned above at pH 1-2 is absent. The method invented by us is more effective in reducing potassium impurity as would be clear from the examples given later.

The present process for reducing potassium content of $MnSO_4$ solution to be used for EMD manufacture prepared from manganese ore containing high potassium impurity has been arrived at by experimenting systematically on various factors like quantity of iron, pH, reaction time, temperature during preparation of $MnSO_4$ solution and their effect on potassium content of this solution.

Accordingly this invention provides process of making manganous sulphate solution with low level impurity of potassium for manufacture of electrolytic manganese dioxide (EMD) from manganese ores containing high potassium impurity comprising adding reduced manganese ore (MnO) to spent electrolyte containing water soluble ferric ions till the pH of 1 to 2 is achieved, and digesting for a period of 1 to 4 hours maintaining the temperature of at least 60° to 90° C., thereafter again adding reduced manganese ore (MnO) till a pH of 4-6 is reached and separating the $MnSO_4$ solution obtained from the precipitated material.

The preferred temperature for digestion at pH 1-2 is 90° C. and it should preferably be continued for at least 3 hours. Longer periods do not materially add to the improvement of the reaction process.

The invention is described below with reference to a preferred manner of carrying out the process.

STEP 1

A source of iron is added to spent electrolyte such that ferric ion concentration in the above solution is between 0.2 to 6 gms per liter or more as required. (Iron concentration required depends upon quantity of potassium to be removed). Metallic iron dissolved in $H_2SO_4$ or $FeSO_4$ itself can be used as source of iron and suitably oxidised to ferric state for the purpose, e.g. by $MnO_2$, $Mn_2O_3$, $O_3$ or $H_2O_2$.

STEP 2

Reduced manganese ore (MnO) is added slowly to above solution of spent electrolyte containing ferric ions, kept agitated at temperature of 90° C. When pH of solution is $1.6\pm0.1$, the addition of reduced ore is stopped.

STEP 3

The whole mass is kept agitated at same temperature (90° C.) for a period of 3 hours.

STEP 4

Reduced ore (MnO) addition is started again slowly till pH of 4-6 is reached for complete precipitation of iron.

STEP 5

The solution of $MnSO_4$ so obtained which is low in potassium content is separated from the precipitate and other insoluble matter by e.g. filtration, decantation or centrifugation.

Following examples illustrate effectiveness of herein proposed method as compared to the ferromanganese method referred to above in removal of potassium impurity from $MnSO_4$ solution.

EXAMPLE 1

Manganese ore analysing $MnO_2$—74%, Mn—51%, Fe—5.5%, silicious matter—5.4%, $Al_2O_3$—2.5%, K—0.9%, Ba—1.2%, was reduced with fuel oil. Reduced ore contained about 3% $MnO_2$, rest of manganese being present as MnO. This was used for making comparative study of $MnSO_4$ solution (fresh electrolyte) prepared from spent electrolyte containing Mn—30 mg/liter, $H_2SO_4$—45 mg/liter and K—660 mg/liter. Ferric sulfate was added to get 4 gm/liter ferric ion concentration. Temperature was maintained throughout the reactions at $90\pm2°$ C. Rest of the processing method was similar to what is stated above.

In another experiment a method similar to ferromanganese processing method referred to above was adopted.

Percentage potassium removed by solid phase concentration of potassium, in spent and fresh electrolyte in the two experiments, is given below:

|  | % of total potassium input (reduced ore + spent electrolyte) removed | K in spent electrolyte mg per liter | K in fresh electrolyte mg per liter |
| --- | --- | --- | --- |
| Method of this invention | 96 | 660 | 50 |
| Method similar to the Ferromanganese method (referred to above) | 45 | 660 | 635 |

EXAMPLE 2

Manganese ore, analysing

|  |  |
| --- | --- |
| $MnO_2$ | 66.2% |
| Mn | 50.9% |
| Fe | 4.5% |
| Silicious matter | 3.7% |
| $Al_2O_3$ | 0.54% |
| K | 2.91% |
| Ba | 1.1%, | was reduced using Fuel Oil. Reduced ore contained about 3% $MnO_2$. This was used for preparing $MnSO_4$ solution from Spent Electrolyte containing Mn—32 gpl, $H_2SO_4$—48.5 gpl, K—392 gm per liter. Weighed $FeSO_4.7H_2O$ crystals were added to the Spent Electrolyte so that iron concentration of 6 gpl was reached. This was further oxidised by addition of $MnO_2$ ore.

Fresh Electrolyte from above materials was prepared using two methods.

Method No. 1 was similar to Ferromanganese method (method "b" referred to hereinabove) in which reaction was carried out at 70° C.

Method No. 2 is the method of the herein invention.

|  | % of total Potassium input (reduced ore + spent electrolyte) removed | Potassium content mg/liter | |
| --- | --- | --- | --- |
|  |  | Spent Electrolyte | Fresh Electrolyte |
| Method - 1 | 39.2 | 392 | 1262 |
| Method - 2 | 87.2 | 392 | 256 |

The above examples show effectiveness of the processing method invented by us in obtaining a manganous sulfate solution containing low potassium impurity (in acceptable amounts for manufacture of EMD) from ore containing potassium more than 0.8%.

Using above solution for plating, EMD of the following specification has been made:

| CHEMICAL ANALYSIS | |
| --- | --- |
| $MnO_2$ | 90% Min. |
| Combined water | 3% Min. |
| Sulfate | 1.5% Max. |
| Potassium | 0.3% Max. |
| Crystal phase | Essentially Gamma |

What is claimed is:

1. A process for making a manganese sulphate solution with low level impurity of potassium which can be used to make electrolytic manganese dioxide for battery use, from manganese ores containing high potassium impurity which comprises adding reduced manganese ore (MnO) to spent electrolyte containing Mn, $H_2SO_4$ and water soluble ferric ions till a pH of 1 to 2 is achieved, digesting the mixture at a temperature of at least 60° C. to 90° C. for a period of 1 to 4 hours, and then adding additional reduced manganese ore (MnO) till a pH of 4 to 6 is reached followed by separating the $MnSO_4$ solution obtained from the precipitated material.

2. The process according to claim 1 in which the temperature of digestion is 90° C.

3. The process according to claim 1 in which the first mentioned pH is 1.6.

4. The process according to claim 1, 2 or 3 in which the digestion is continued for 3 hours.

5. The process according to claim 1, 2 or 3 in which the source of ferric ions is a solution of $FeSO_4$ oxidized in situ by an oxidizing agent.

6. The process according to claim 1 in which the first mentioned pH is 1.6 and in which the digestion is continued for 3 hours at 90° C.

* * * * *